United States Patent [19]

Neal et al.

[11] Patent Number: 4,755,499

[45] Date of Patent: Jul. 5, 1988

[54] SORBENT FOR REMOVING NITROGEN OXIDES, SULFUR OXIDES AND HYDROGEN SULFIDE FROM GAS STREAMS

[75] Inventors: Lewis G. Neal, Danville, Calif.; John L. Haslbeck, Paducah, Ky.; Hsiaopin Tseng, Kansas City, Mo.

[73] Assignee: Noxso Corporation, Library, Pa.

[21] Appl. No.: 905,138

[22] Filed: Sep. 9, 1986

Related U.S. Application Data

[63] Continuation of Ser. No. 659,996, Oct. 12, 1984, abandoned.

[51] Int. Cl.$^4$ .............................................. B01J 20/00
[52] U.S. Cl. ................................... 502/415; 502/414; 502/504
[58] Field of Search ................. 502/414, 415, 504; 423/239

[56] References Cited

U.S. PATENT DOCUMENTS

| | | | |
|---|---|---|---|
| 2,684,283 | 7/1954 | Ogg et al. | 423/239 |
| 2,992,884 | 7/1961 | Bienstock et al. | 423/244 |
| 3,065,056 | 11/1962 | Geerts et al. | 423/384 |
| 3,260,679 | 7/1966 | O'Grady et al. | 502/174 |
| 3,291,564 | 12/1966 | Kearby | 423/212 |
| 3,382,033 | 5/1968 | Kitagawa | 423/239 |
| 3,398,131 | 8/1968 | Bloch et al. | 526/175 |
| 3,410,909 | 11/1968 | Fleischer et al. | 568/396 |
| 3,411,865 | 11/1968 | Pijpers et al. | 423/244 |
| 3,492,083 | 1/1970 | Lowicki et al. | 423/244 |
| 3,498,743 | 3/1970 | Kyllonen | 423/239 |
| 3,551,093 | 12/1970 | Myers et al. | 423/244 |
| 3,557,025 | 1/1971 | Emerson et al. | 502/415 |
| 3,589,863 | 6/1971 | Frevel et al. | 73/864.85 |
| 3,632,314 | 1/1972 | Torrence | 423/573 R |
| 3,660,032 | 5/1972 | Torrence | 423/563 |
| 3,669,617 | 6/1972 | Lowicki et al. | 423/244 |
| 3,682,585 | 8/1972 | Frevel et al. | 423/219 |
| 3,725,531 | 4/1973 | Pearson et al. | 423/244 |
| 3,755,535 | 8/1973 | Naber | 423/244 |
| 3,755,556 | 8/1973 | Aldridge | 423/655 |
| 3,864,450 | 2/1975 | Takeyama et al. | 423/239 |
| 3,880,618 | 4/1975 | McCrea et al. | 55/68 |
| 3,948,809 | 4/1976 | Norman et al. | 502/415 |
| 3,957,952 | 5/1976 | Naber et al. | 423/244 |
| 3,974,096 | 8/1976 | Segura et al. | 502/174 |
| 4,071,436 | 1/1978 | Blanton, Jr. et al. | 208/120 |
| 4,301,037 | 11/1981 | Sanchez et al. | 502/439 |
| 4,315,839 | 2/1982 | Bouge et al. | 502/439 |
| 4,323,544 | 4/1982 | Magder | 423/244 |
| 4,426,365 | 1/1984 | Magder | 423/239 |
| 4,493,715 | 1/1985 | Hogan et al. | 502/415 |

FOREIGN PATENT DOCUMENTS

| | | |
|---|---|---|
| 2419103 | 10/1975 | Fed. Rep. of Germany . |
| 88554 | 3/1921 | Switzerland . |
| 1154009 | 6/1969 | United Kingdom . |

OTHER PUBLICATIONS

Process Development In Removing Sulfur Dioxide From Hot Flue Gases, By D. Bienstock, J. H. Field and J. G. Myers, Report of Investigations 5735, Bureau of Mines, pp. 8–17 1961.

Nielsen, I. "Low Cost Air–Water Pollution Control Chemicals From Colorado Oil Shale Deposits" Chemical Abstracts vol. 79, 1973, 34858g, p. 198.

Primary Examiner—H.M.S. Sneed
Assistant Examiner—Chung K. Pak
Attorney, Agent, or Firm—R. Gale Rhodes, Jr.

[57] ABSTRACT

Novel sorbents comprising (a) an alumina substrate having a pore volume between 0.4 and 0.8 cc/g, and (b) an alkali or alkaline earth component, for example, sodium carbonate, wherein the amount of the alkali or alkaline earth component is between 50 and 400 μg per m$^2$ of the substrate. The sorbents of the present invention are outstandingly effective for the removal of nitrogen oxides, sulfur oxides and hydrogen sulfide from waste gas streams.

13 Claims, 4 Drawing Sheets

SORBENT FOR REMOVING NITROGEN OXIDES, SULFUR OXIDES AND HYDROGEN SULFIDE FROM GAS STREAMS

This is a continuation of application Ser. No. 659,996, filed Oct. 12, 1984, now abandoned.

BACKGROUND OF THE INVENTION

The present invention relates to sorbents and processes for removing pollutants from gas streams using such sorbents. More particularly, the sorbents of the present invention are resistant to physical degradation which results from recurring adsorption and regeneration. More specifically, the invention is directed to removing nitrogen oxides, sulfur oxides and hydrogen sulfide from gas streams.

The nitrogen oxides which are pollutants are nitric oxide (NO) and nitrogen dioxide ($NO_2$ or $N_2O_4$). The relatively inert nitric oxide is often only difficultly removed, relative to $NO_2$. The lower oxide of nitrogen, $N_2O$ (nitrous oxide), is not considered a pollutant at the levels usually found in ambient air, or as usually discharged from effluent sources. Nitrous oxide, however, degrades (decomposes) in the atmosphere to produce nitric oxide and thus eventually becomes a polluting component.

Sulfur oxides considered to be pollutants are sulfur dioxide and sulfur trioxide.

Particularly obnoxious sources of nitrogen and sulfur oxide pollutants are power plant stack gases, automobile exhaust gases, heating plant stack gases, and various industrial process effluents such as smelting operations and nitric and sulfuric acid plants.

Power plant emissions represent an especially formidable source of nitrogen oxides and sulfur oxides, by virtue of the very large tonnage of these pollutants in such emissions discharged into the atmosphere annually. Moreover, because of the low concentration of the pollutants in such emissions, typically 0.05% or less for nitrogen oxides and 0.3% or less for sulfur dioxide, their removal is difficult because very large volumes of gas must be treated.

Hydrogen sulfide is a pollutant in the effluents of the following operations: coal gasification, coal liquefaction, oil shale processing, tar sands processing, petroleum processing and geothermal energy utilization.

Of the few practical systems which have hitherto been proposed for the removal of nitrogen oxides from power plant flue gases, all have certain disadvantages. One such process entails scrubbing the gas with a slurry of magnesium hydroxide or carbonate; the slurry is regenerated by treatment with ammonia. This process, however, produces by-product ammonium nitrate which is difficult to dispose of, and also requires cooling and reheating of the flue gas stream.

Processes for the removal of nitrogen oxides from gases using various sorbents are discussed in the following: U.S. Pat. No. 2,684,283 to Ogg, Jr. et al (sorbent: mass of ferric oxide and sodium oxide); U.S. Pat. No. 3,382,033 to Kitagawa (sorbent: porous carrier impregnated with $FeSO_4+H_2SO_4$, $FeSO_4$, $FeSO_4.(NH)_4SO_4$, $PdSO_4$, $KMnO_4$, $KMnO_4+H_2SO_4$, $KClO_3$, $NaClO+NaOH$, $NaClO_2+NaOH$, $Na_2MoO_4$, $K_2S_2O_3$, $Na_2S_2O_3+NaOH$, $NaHPO_4$, $Na_2O_2$, $As_2O_2+NaOH$, $CuCl_2$, or $ICl_3+NaOH$); U.S. Pat. No. 3,498,743 to Kyllonen (use of a bed of finely divided solid sodium carbonate); and U.S. Pat. No. 3,864,450 to Takeyama et al (use of a catalyst consisting essentially of carbon impregnated with sodium or potassium hydroxide).

Various methods have been proposed for the removal of sulfur dioxide from power plant flue gases, but all of these have disadvantages. For example, wet scrubbing systems based on aqueous alkaline materials, such as solutions of sodium carbonate or sodium sulfite, or slurries of magnesia, lime or limestone, usually necessitate cooling the flue gas to about 55° C. in order to establish a water phase. At these temperatures the treated gas requires reheating in order to develop enough buoyancy to obtain an adequate plume rise from the stack. Moreover, such processes create products involving a solid waste disposal problem.

Various solid phase processes for the removal of sulfur dioxide which have hitherto been proposed also have disadvantages. The use of limestone or dolomite, for example, to adsorb sulfur dioxide creates a waste disposal problem because the solid is not regenerated.

Processes for the removal of sulfur oxides from gases using various sorbents are discussed in the following: U.S. Pat. No. 2,992,884 to Bienstock et al (sorbent: alkali metal oxide dispersed on a carrier such as alumina or chromia); U.S. Pat. No. 3,411,865 to Pijpers et al (sorbent: alkali metal oxide and iron oxide dispersed on a carrier such as alumina, magnesia or chromia); U.S. Pat. Nos. 3,492,083 and 3,669,617 to Lowicki et al (sorbent: oxide, hydrated oxide or hydroxide of aluminium, zinc, iron or manganese and an oxide or hydroxide of an alkali metal or alkaline earth metal); U.S. Pat. No. 3,589,863 to Frevel (porous alkali metal bicarbonate aggregates); U.S. Pat. No. 3,755,535 to Naber (sorbent: activated alumina or magnesia impregnated on inert carrier); U.S. Pat. No. 3,948,809 to Normal et al (sorbent: bauxite and alkali metal carbonate); U.S. Pat. No. 3,959,952 to Naber et al (sorbent: alumina carrier impregnated with copper and aluminum, magnesium, titanium or zirconium) and United Kingdom No. 1,154,009 (sorbent: vanadium compound and an alkali metal compound).

U.S. Pat. No. 3,880,618 to McCrea et al concern the simultaneous removal of sulfur and nitrogen oxides from gases using alkalized alumina or alkali metal carbonate or oxide.

U.S. Pat. No. 4,071,436 to Blanton, Jr. et al describes the removal of sulfur oxides using reactive alumina.

Alkalized alumina is discussed in the following: D. Beinstock, J. H. Fields and J. G. Myers, "Process Development in Removing Sulfur Dioxide from Hot Flue Gases" 1. Bench-Scale Experimentation, Report of Investigations 5735, United States Department of the Interior, pp. 8–17; U.S. Pat. No. 3,551,093 to J. G. Myers et al and U.S. Pat. No. 3,557,025 to Emerson et al. As discussed hereinbelow in greater detail, alkalized alumina sorbents, heretofore utilized for flue gas treatment have exhibited severe degradation of their attrition resistance due to the chemical processes of adsorption and regeneration.

The alkalized alumina sorbent is manufactured by precipitating dawsonite ($NaAl(OH)_2CO_3$) from a solution of $Al(SO_4)_3$ and $Na_2CO_3$ at 90° C. The resulting solid is then heated to 130° C. to dry the residue moisture and crushed to a small size. Since the dawsonite is formed through precipitation, it has a very tight solid structure with little room to absorb $SO_2$. Therefore, the chemically bonded $H_2O$ and $CO_2$ have to be removed through calcination at high temperatures in order to form a porous sorbent.

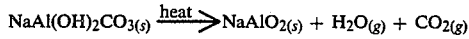

The calcinated sorbent (NaAlO$_2$), known as alkalized alumina, is thereafter useable in a flue gas treatment process.

Sodium is an integral part of the whole crystal structure of alkalized alumina. The concentration of sodium in alkalized alumina is about 25% by weight.

The chemical process of adsorption produces changes in the sorbent and creates internal forces that cause sorbents of a type similar to those of the present invention, e.g., alkalized alumina sorbent, to attrite (crumble) rapidly. The sorbents of the present invention do not suffer from this attrition problem which has been associated with sorbents of a similar type, such as alkalized alumina.

As adsorption proceeds, the sulfite/sulfate product layer growth takes place in both directions from the initial pore boundary, however, the growth into the substrate material is limited to only a very thin layer for the impregnated sorbent. As the product layer grows into the alkalized alumina material itself, it disrupts and distorts the crystal structure. The product molecule (Na$_2$SO$_3$ and Na$_2$SO$_4$) volumes are much larger than the unreacted molecules (Na$_2$O) so the product layer produces a very disturbed and weakened material. As the growth continues, the product layer buckles and cracks producing pathways even deeper into the substrate body. The effect of this process is to create physical stresses that dramatically increase sorbent attrition. The growth proceeds with both impregnated and coprecipitated sorbent until all the sodium is consumed or until all the void space within the pore is occupied. Most of the surface area, and consequently the sodium, exists in the many very small pores of the impregnated sorbent. The dimension of these pores decreases continuously to sizes orders of magnitude smaller than the average pore diameter. In fact, many of the pores are of the size of the product molecule.

U.S. Pat. Nos. 4,323,544 and 4,426,365 both assigned to the assignee of the present invention, concern processes for the removal of nitrogen oxides using a sorbent comprising alumina having a surface area of about 20 m$^2$/g and an alkaline component comprising at least one salt of a Group IA (alkali metal) or Group IIA (alkaline earth metal).

As pointed out above, a major drawback of heretofore used sorbents for removal of sulfur oxides and/or nitrogen oxides is that such sorbents suffer from attrition. The sorbents of U.S. Pat. Nos. 4,323,544 4,426,365, which are quite effective in removing pollutants from waste gas streams, begin to suffer irreversible attrition at 175° C. Accordingly, it would be quite advantageous to have a sorbent which is not only effective in removing gaseous pollutants such as sulfur oxides and nitrogen oxides, but is also able to withstand high temperatures without undergoing attrition.

The present invention provides sorbents that do not unduly degrade (does not unduly attrite) as a result of chemical use.

The present invention further provides a method of removing nitrogen oxides and, optionally, sulfur oxides, from waste gas streams simultaneously, in a single process. Moreover, in the present invention it is possible to treat waste gas streams at temperatures at which the streams still have adequate buoyancy to obtain good plume rise from the stack. The sorbents of this invention remove NO$_2$, as well as the relatively inert NO, in an efficient manner.

The present invention also provides for the removal of nitrogen oxides and sulfur oxides from waste gases (which process produces elemental nitrogen and elemental sulfur) without producing solid waste product which would create a disposal problem. The process of the present invention utilizes only relatively small quantities of natural gas or other hydrocarbon fuel.

The present invention also provides for the removal of hydrogen sulfide.

SUMMARY OF THE INVENTION

The present invention concerns a sorbent for removal of gaseous nitrogen oxides, sulfur oxides and hydrogen sulfide from waste gas streams containing one or more of gaseous nitrogen oxides, sulfur oxides and hydrogen sulfide. The sorbent of the invention includes an alumina substrate, preferably a gamma-alumina substrate, and an alkali or alkaline earth compound, i.e., alkali metal (a Group IA metal) or an alkaline earth metal (a Group IIA metal). The alkali or alkaline earth metal is contained in an amount between 50 and 400 $\mu$g per m$^2$ of substrate and preferably between 100 and 350 $\mu$g per m$^2$ of substrate, and most particularly between 150 and 250 $\mu$g per m$^2$ of substrate.

The process of the present invention comprises contacting a waste gas stream containing oxides of nitrogen and, optionally, oxides of sulfur with a sorbent comprising alumina and a alkali or alkaline earth component to sorb at least part of the nitrogen oxides and sulfur oxides. The sorbent having the alkali or alkaline component contained therein in an amount between 50 and 400 $\mu$g per m$^2$ of substrate and preferably between 100 and 350 $\mu$g per m$^2$ and, particularly between about 150 and 250 $\mu$g per m$^2$. The nitrogen- and sulfur-laden sorbent is then regenerated by heating the sorbent in a reducing atmosphere, e.g., hydrogen or hydrogen sulfide-containing gas stream, at temperatures up to about 650° C., whereby nitrogen is removed as elemental nitrogen and sulfur is removed as elemental sulfur. Alternatively, regeneration is conducted by heating the sorbent in an inert atmosphere at temperatures up to about 350° C. to 650° C., whereby the nitrogen oxide is removed as nitric acid, and then contacting the hot sorbent with a reducing agent, whereby the sulfur is removed as elemental sulfur. The sulfur produced in regeneration may be partially used to produce hydrogen sulfide, while the remainder of the sulfur is recovered. The regenerated sorbent is then used for further removal of oxides of sulfur and nitrogen.

The present invention includes a process for removing hydrogen sulfide from a gas stream. This process for hydrogen sulfide removal involves contacting the gas stream containing hydrogen sulfide with the above described sorbent at temperatures ranging from 300° C. to 650° C. Regeneration of the spent sorbent for such process is conducted using steam, whereby the hydrogen sulfide is displaced from the sorbent and removed from the sorbent surface. The excess steam is subsequently condensed producing a stream of high hydrogen sulfide concentration for direct use or for further processing.

DETAILED DESCRIPTION OF THE INVENTION

Figure 1:
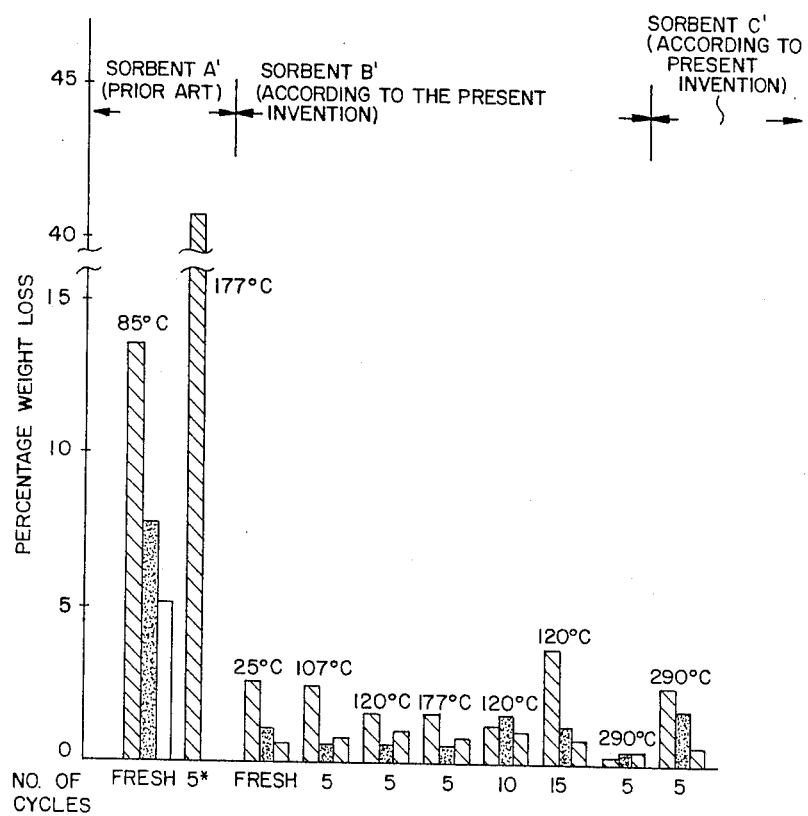
FIG. 1 is a summary of attrition test results comparing a prior sorbent with sorbents according to the present invention.

Alumina in the present invention means a form of alumina with an extended surface area, usually above about 100 square meters per gram, and often as high as 400 or 500 square meters per gram. For NOx removal alone, surface areas of 20 m²/g are operative. Many methods are known in the are whereby such forms of alumina may be prepared. For example, high surface area alumina may be precipitated from a sodium aluminate solution or sol by the addition of an acidic material such as carbon dioxide, mineral acid, or an acidic salt such as aluminum sulfate. Other methods of producing high surface area aluminas involve the dehydration of aluminum hydroxides such as aluminum hydrate (Al(OH)₃) or bauxite. Activated bauxite is a particularly useful source of alumina for the present invention because of its low cost. A further useful source of high-surface-area alumina for purposes of the present invention are the by-products from the hydrolysis of aluminum alkoxides such as aluminum tri-isopropoxide. Such aluminas which are characterized by extremely high purity in terms of the absence of other metallic elements, have recently become commercially available at relatively low cost.

Gamma-alumina is the preferred form of alumina for the substrate of the sorbent of the present invention.

The alumina substrate of the present invention has pores therein for receiving the alkali or alkaline earth component. In an embodiment of the present invention, the substrate is prepared by adhering individual particles of gamma-alumina to each other. Such particles having pores therein. Accordingly, such substrate has internal particle pores of a certain small diameter, $d_1$, and pores between each particle, i.e., interstices, of a certain small diameter, $d_2$. The pores $d_1$ have an average pore diameter of between 30 and 400 Angstroms, preferably between 60 and 200 Angstroms, and more particularly, between 80 and 100 Angstroms. The pores $d_2$ have an average particle diameter of between 80 and 3000 Angstroms, preferably between 100 and 1000 Angstroms, and more particularly, between 200 and 500 Angstroms.

The overall pore volume of the alumina substrate of the invention is between 0.4 and 0.8 cc/g, preferably between 0.6 and 0.8 cc/g. The surface area of the alumina substrate is between 100 m²/g and 500 m²/g.

It is also within the present invention to utilize as a sorbent solely gamma-alumina (having no further component such as sodium). Such gamma-alumina having a pore volume of between 0.4 and 0.8 cc/g and a surface area between 100 m²/g and 500 m²/g. Such sorbent can be utilized in the processes described herein in the same manner, i.e., same temperatures and residence times, as sorbents containing an alkali metal or alkaline earth metal.

The alkali or alkaline earth component of the sorbent of the present invention is an alkali metal, i.e., Group IA metal, namely, Li, Na, K, Rb, Cs or Fr, or an alkaline earth metal, i.e., Group IIA metal, namely, Be, Mg, Ca, Sr, Ba or Ra. The preferred components are sodium, potassium and calcium, with sodium being particularly preferred.

The alkali or alkaline earth component of the sorbent of the present invention may be advantageously incorporated as the hydroxide, carbonate, nitrate, acetate, or other soluble salt of a Group IA metal, or of a Group IIA metal.

It will be understood that mixed salts also may be used as i.e., a mixture of salts (1) having the same metal but different anion portions, or (2) having the same anion but different metal portions, or (3) having different metal and anion portions, may be used. For instance, a mixture of sodium acetate and carbonate, or a mixture of potassium and sodium carbonates, or a mixture of potassium acetate and sodium carbonate may be advantageously employed.

The sorbent according to the present invention can be prepared by the "dry impregnation" technique. The alkali or alkaline earth component, e.g., sodium, is loaded onto the substrate, e.g., gamma-alumina, by spraying the substrate with a solution of a salt of the alkali or alkaline earth component, e.g., a sodium carbonate solution. The impregnated sorbent is subsequently heated to dry the residue moisture. It has been found by preparing the sorbent as described below, that the alkali or alkaline earth component in evenly distributed inside the pores of the substrate. The chemical reactions involved in the sorbent preparation as described above are as follows:

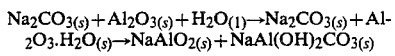

$Na_2CO_{3(s)} + Al_2O_{3(s)} + H_2O_{(l)} \rightarrow Na_2CO_{3(s)} + Al_2O_3 \cdot H_2O_{(s)} \rightarrow NaAlO_{2(s)} + NaAl(OH)_2CO_{3(s)}$ The dry impregnated sorbent is the final product and can be readily used in flue gas cleaning processes. In constrast thereto, alkalized alumina sorbent such as developed by the U.S. Bureau of Mines requires calcination at high temperature before use in such processes.

In further contrast to alkalized alumina wherein the sodium is distributed throughout the entire solid matrix, in the sorbent of the present invention, the alkali or alkaline component is coated only on the internal surface, i.e., on the porous structure of the substrate.

The sorbent of the present invention can be further characterized in that the layer of alkali or alkaline earth salt component, e.g., $Na_2CO_3$, on the surface of the porous structure does not exceed approximately one molecule thickness.

Without wishing to be bound by any particular theory of operability, it is believed that there is a critical level of alkali or alkaline earth component, e.g., sodium loading per pore volume, surface area of substrate beyond which the physical strength of the sorbent particle is severely weakened, thus leading to attrition.

FIG. 1 shows a series of bar graphs of percentage weight loss versus number of cycles for three sorbents subjected to attrition testing. Each bar represents an incremental percentage weight loss over a ten minute period in the attrition test.

The sorbents tested had the following physical characteristics:

| Physical Characteristics | Sorbent A' | Sorbent B' | Sorbent C' |
|---|---|---|---|
| % Sodium | 3.50 | 3.46 | 6.55 |
| Compact Bulk Density, lbs./ft$^3$ | 50.0 | 42.4 | 46.3 |
| Surface Area, m$^2$/gm | 225 | 222 | 144 |
| Pore Volume by H$_2$O, cc/gm | 0.22 | 0.78 | 0.62 |

Sorbents B' and C' are according to the present invention; Sorbent A' is a prior art sorbent.

The sorbents were tested in an Accelerated Air Jet Attrition (AAJA) test apparatus for a period of 30 minutes. The AAJA apparatus was developed by W. R. Grace & Co. AAJA tests measure the attrition strength of sorbents exposed to various operating conditions over a number of chemical cycles.

A typical AAJA test apparatus is described as follows:

A 50 gram sample of sorbent previously screened to +10, −20 mesh is placed in an inverted one liter Pyrex, wide mouth (45 mm diameter), Erlenmeyer flask. The flask has a 6.2 cm diameter hole centered in its bottom which is covered by a 40 mesh screen. The mouth of the flask is fitted with a nylon stopper having a concave bottom roughly 1.1 cm deep. A ¼" O.D. (⅛" I.D.) stainless steel tube is inserted through a hole in the stopper to a point even with the concave bottom and the tube opening is covered by a small piece of 60 mesh screen. The stopper is held tight to the flask mouth by means of two rubber "O" rings fitted into grooves carved into the side of the stopper.

Air is obtained from a pressurized gas cylinder equipped with a pressure regulator. The air passes through ⅜" flexible, "TEFLON" tubing to a drying tube, a valve, a rotometer (0–6.43 ACFM at 21° C., 1 atm.) and into the ¼" tube fitted through the stopper inserted into the mouth of the inverted Erlenmeyer flask. The flask is supported by a ring clamp attached to a stand and placed within a laboratory fume hood. The flask is levelled on the stand prior to the start of the test.

Sorbent B' was tested at four different adsorption temperatures ranging from 107° C. to 290° C. In each case, the sample was subjected to five cycles of adsorption/regeneration. The first adsorption was performed in a fluidized bed. The sample was then transferred to a fixed bed reactor for the remainder of the test. A single sample of Sorbent B' was also tested over 15 cycles of operation at a constant adsorption temperature of 120° C. From FIG. 1, it can be seen that the attrition rate of this sorbent appears to be unaffected by adsorption temperature or by the number of chemical cycles. The percentage weight loss in the second and third ten minutes of the attrition test on each sample in this series was essentially the same, in most cases less than 1 percent of sample weight.

The apparent differences in percentage weight loss during the first 10 minutes of attrition tests on Sorbent B' are believed to be attributable to different methods of sample preparation. All samples in the series, other than the five cycle test at 290° C., were initially prepared by screening roughly 250 grams of the sorbent in a mechanical shaker for 20 minutes and then extracting a 150 gram sample of the 10×20 mesh size fraction. For the test at 290° C., small quantities of the sorbent were carefully screened by hand to eliminate all particles smaller than 10×20 mesh prior the test. As seen in FIG. 1, the weight loss in the first ten minutes of the test on this sample was considerably less than all others in the series. It is believed that a significant portion of the loss in the first ten minutes for all other samples in this series is due to the presence of particles smaller than 20 mesh in the original sample placed in the fixed bed reactor.

FIG. 1 also shows the results of attrition tests performed on Sorbent A' and Sorbent B'. The attrition rate of Sorbent A' was considerably higher than Sorbent B' in tests on both the fresh and the cycled material. The sample of Sorbent A' tested after five cycles at 177° C. yielded a weight loss of 41.5% after the first ten minutes of the attrition test, as compared with a corresponding 1 to 2% loss for all samples of Sorbent B' tested. The major difference between these two sorbents is in pore volume; each has roughly the same surface area and sodium loading. The pore volume of Sorbent B' is more than three times greater than that of Sorbent A'.

Sorbent C' has twice the sodium loading and roughly 65 percent of the surface area of Sorbent B'. Sorbent C' was also tested after five cycles at 290° C.

The sorbents according to the present invention (Sorbents B' and C') exhibited very litte percentage weight loss even at temperatures up to 290° C. and with 15 cycles (one absorption-one regeneration per cycle). In contrast, the sorbent with the 0.22 cc/g pore volume (Sorbent A') experienced a dramatic increase in attrition rate at 177° C. It is believed that reduced pore volume limits the space available for product layer expansion, thereby resulting in a significant increase in stress in the sorbent particle and an increased attrition rate. The run at 177° C. for Sorbent A' was aborted after the first ten minutes due to the excessively large initial weight loss.

Figure 2:
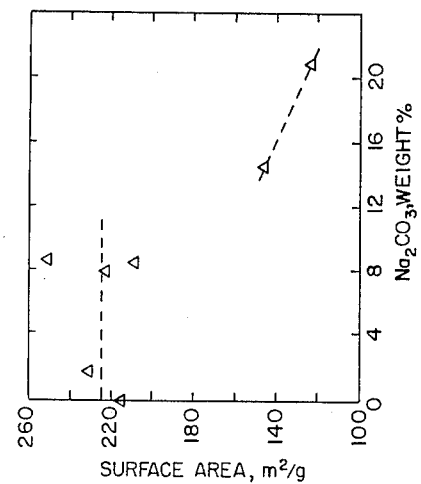
FIG. 2 is a plot of surface area (m²/g) versus $Na_2CO_3$ content, weight %, demonstrating the effect of sodium loading on the surface area of gamma alumina substrate.

The effect of sodium loading on the surface area of gamma-alumina substrate is illustrated in FIG. 2. When the sodium loading is low, the sodium salt, i.e., Na$_2$CO$_3$, layer is approximately one molecule thick. When the loading increases to the extent that most of the internal surface is covered, the molecules of Na$_2$CO$_3$ begin to pile up. As a result, the thickness of the Na$_2$CO$_3$ layer will increase proportional to the loading. FIG. 2 indicates that when the Na$_2$CO$_3$ loading is below about 8%, the surface area remains fairly constant, because it is only partially covered with a mono-molecular layer of Na$_2$CO$_3$. However, when the Na$_2$CO$_3$ loading increases above 8%, (e.g., 12 to 20%) the thickness of the Na$_2$CO$_3$ layer rapidly expands. The expansion of the Na$_2$CO$_3$ layer results in reduced pore diameters and consequently reduced surface areas.

A comparison of the typical characteristics of a sorbent according to the present invention and alkalized alumina is as follows:

| | Sorbent According To Present Invention | Alkalized Alumina |
|---|---|---|
| Total Sodium Loading, wt % | 3.5 | 20–25 |

|  | Sorbent According To Present Invention | Alkalized Alumina |
| --- | --- | --- |
| Surface Area, m²/g | 222 | 47 |
| Pore Volume, cc/g | 0.69 | 0.69 |
| Average Pore Diameter, nm | 12.4 | 58.7 |

The exact chemical or crystallographic form of the sorbent is not narrowly critical in the present invention. It is believed that the alumina in the prepared sorbent is poorly crystalline and exists as gamma-$Al_2O_3$ and gamma-$Al_2O_3H_2O$. When sodium is employed as $Na_2CO_3$, it exists in the sorbent as $Na_2CO_3$, $Na_2CO_3H_2O$, gamma-$NaAlO_2$, beta-$NaAlO_2$ and $NaAl(OH)_2CO_3$. The sorbent may change in structure after regeneration as compared to its fresh condition. The alkaline component may be present as the oxide, hydroxide, carbonate, or aluminate, or mixtures of these compounds, when the sorbent is freshly prepared or after it has been regenerated. Various amounts of sulfur or nitrogen containing salts may also be present, such as nitrates, nitrite, sulfate, sulfite, or sulfide.

Various other metallic oxides, such as copper, iron, vanadium, zinc, molybdenum, or rare earth elements, may also be present in amounts up to about 10 atom percent, based on the total atoms of aluminum, alkaline component, and other metal(s).

The waste gas stream containing nitrogen oxides and sulfer oxides is contacted with the sorbent at temperatures of 85° C. to about 200° C., and preferably about 90° C. to 150° C. At higher temperatures the efficiency of nitrogen oxide removal is decreased, while at lower temperatures the waste gas stream would require reheating or recompression to develop adequate stack plume.

The sorbent and waste gas may be contacted in a fixed bed, fluid bed, or moving bed, according to methods which are known in the art. If the contacting is in a fixed bed the gas residence time is in the range of 0.1 to about 10 seconds but a wider range is possible in fluid bed operation.

After the sorbent has become laden with nitrogen and, optionally, sulfur, preferably to a level corresponding to greater than about one equivalent of nitrogen plus sulfur for each five equivalents of alkaline component, it is regenerated. For this purpose one equivalent of sulfur is taken as one-half of a gram-atom, one equivalent of nitrogen is one gram-atom, one equivalent of alkali metal is one gram-atom, and one equivalent of alkaline earth metal is one-half of a gram atom. The sorbent is regenerated by contact with a regenerant gas stream containing at least 0.01 atmosphere partial pressure of reducing gas such as hydrogen or hydrogen sulfide, at temperatures of about 350° C. to about 700° C., for a period of time sufficient to recover a substantial portion of the sorbent's capacity for nitrogen oxide and sulfur oxide sorption. The minimum time required for regeneration depends strongly on the temperature and partial pressure of hydrogen sulfide in the regenerant gas, and may vary from a few minutes at 750° C. for 12 hours or more at lower temperatures.

The regenerant gas preferably contains carbon dioxide or water vapor, and, more preferably, contains both carbon dioxide and water vapor. Alternatively, the sorbent is treated with carbon dioxide and/or water vapor after contacting with the hydrogen-sulfide containing regenerant gas. When carbon dioxide and/or water vapor are used, such are preferably employed in total amounts corresponding to at least about one mole of carbon dioxide and/or water vapor per mole of oxide gas sorbed before regeneration.

A convenient means of obtaining a suitable regenerant gas containing carbon dioxide is by the catalytic vapor phase reaction of steam, sulfur, and a hydrocarbon such as methane, essentially according to the following reaction:

$$CH_4 + 2H_2O4S \rightarrow 4H_2S + CO_2.$$

For the purpose of this invention, the use of hydrogen sulfide in the regenerant gas should be taken to include the use of other compounds which will essentially form hydrogen sulfide under the conditions of regeneration, viz. carbon disulfide or carbon oxysulfide in the presence of steam, such as by the following reactions:

$$CS_2 + 2H_2O \rightleftharpoons CO_2 + 2H_2S,$$

or $$COS + H_2O \rightleftharpoons CO_2 + H_2S.$$

During regeneration sulfur forms in the regenerant stream and is condensed by cooling downstream from the sorbent. During this process at least part of the hydrogen sulfide is converted to elemental sulfur. Any unconverted hydrogen sulfide can be readily recycled after the sulfur has been condensed.

After the sorbent has been regenerated, it is cooled to the sorption temperature, for example, by contacting with a cooler water gas stream. The sorbent is then re-used for removing sulfur oxides and nitrogen oxides.

In an embodiment of the present invention, a concentrated stream of nitrogen oxides removed by a sorbent, such as the sorbent described herein, from waste gas streams containing the same can be recycled back to the source of such nitrogen oxides, e.g., a steam boiler, after regenerating the sorbent, i.e., driving off the nitrogen oxides from the sorbent. In this embodiment, the nitrogen oxide level in the boiler reaches a certain equilibrium, e.g., 600 ppm, and thus the recycled nitrogen oxides will be broken down in the steam boiler without increasing the nitrogen oxides ppm in the stack effluent gas.

Figure 3:
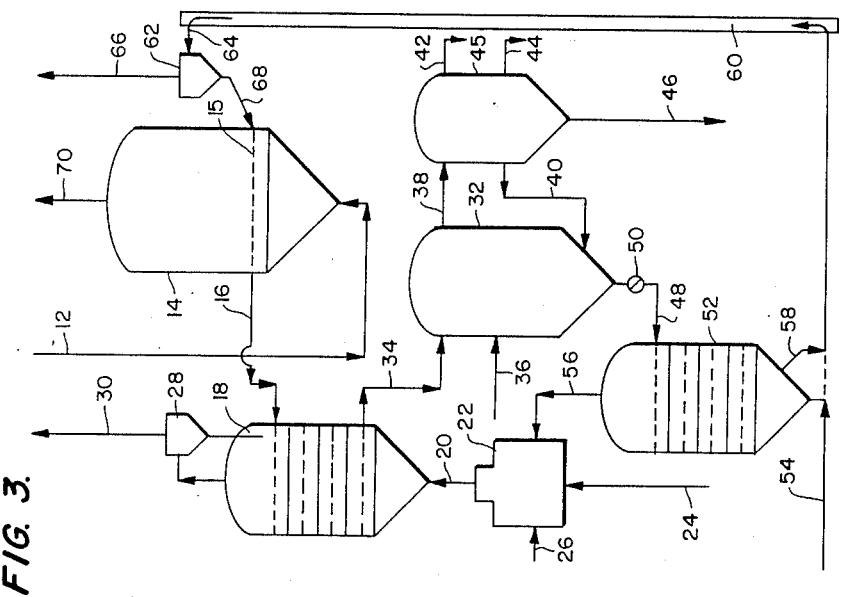
FIG. 3 is a flow diagram depicting a process of the present invention for the simultaneous removal of sulfur oxides and nitrogen oxides from flue gas.

Referring to FIG. 3, wherein like numerals indicate like elements, there is shown a flue gas stream 12 containing both $SO_x$ and $NO_x$ from a power plant (not shown) which is passed through a fluid bed adsorber 14 containing sorbent according to the present invention. Adsorber 14 has a fluidizing grid 15. The sulfur oxides and nitrogen oxides are adsorbed on the surface of the sorbent and removed from the flue gas stream.

The saturated sorbent 16 is subsequently transported to a staged, fluid bed heater 18 wherein the sorbent temperature is raised above 532° C. (1000° F.) using high temperature air 20 supplied by air heater 22 which a stream of ambient air 24 and a fuel stream 26, e.g., natural gas, enter. Simultaneously, the sorbed $NO_x$ is stripped from the sorbent and carried away in the hot gas stream which passes through cylone 28 and via stream 30 is mixed with the power plant combustion air stream (not shown).

The hot sorbent is removed from the sorbent heater 18 into a moving bed regenerator 32 via line 34. In the moving bed regenerator 32, the sorbent is contacted with a regenerant gas stream 36. The regenerant gas 36 reacts with the sorbed sulfur oxides to produce elemental sulfur. Off-gas stream 38 containing elemental sulfur is transported into a sulfur condenser and mist eliminator 45 wherein a steam stream 42, water stream 44 and elemental sulfur stream 46 are produced. A stream 40 from sulfur condenser and mist eliminator 45 is returned to regenerator 32.

The regenerated sorbent is transported via stream 48 past valve 50 to a staged, fluid bed sorbent cooler 52, where it is contacted with atmospheric air supplied via line 54 to reduce its temperature to about 120° C. (250° F.). The heated atmospheric air 56 subsequently is transported to gas heater 22 where its temperature is increased well above 532° C. (1000° F.) for use as the heated medium in fluid bed heater 18.

Cooled sorbent via line 58 is transported by air in line 54 to a pneumatic lift line 60 into cyclone separator 62 via stream 64. Cyclone separator 62 separates stream 64 into air 66 and sorbent 68. Sorbent stream 68 enters adsorber 14. The discharge gas from adsorber 14 exits via line 70.

Figure 4:
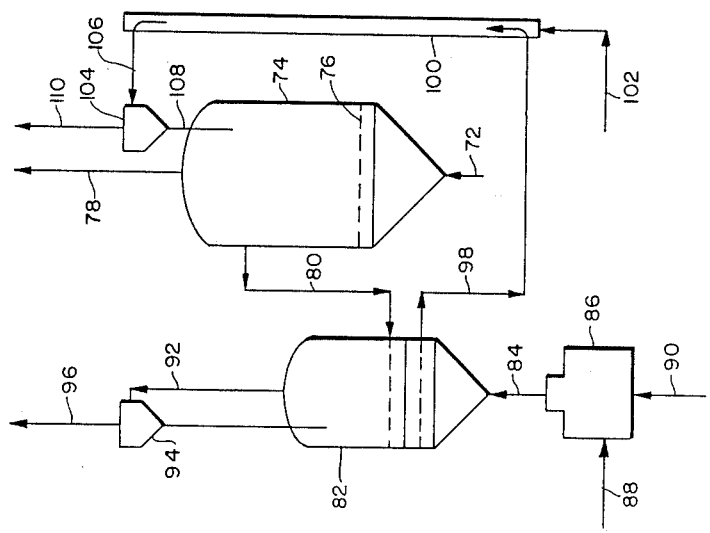
FIG. 4 is a flow diagram depicting a process according to the present invention for the removal of nitrogen oxides from flue gas.

In FIG. 4, a flue gas stream 72 containing $NO_x$ from a combustion facility (not shown) which uses a fuel free of sulfur is passed through a fluidized bed sorber 74 containing sorbent and having a fluidizing grid 76. The $NO_x$ free sorbent is returned to the sorber 74 for reuse via line 108 and the air that was entrained therewith is separated by cyclone 104 and exits via line 110. The $NO_x$ is removed by sorption on the surface of the sorbent. The $NO_x$ free flue gas (clean gas stream) is subsequently discharged to the atmosphere via line 78.

As the sorbent becomes saturated with $NO_x$, it is transported via line 80 to a staged, fluid bed heater 82, wherein it is contacted with a stream of hot air 84. The hot air 84 is generated by an air heated 86 wherein fuel 88 for example, natural gas and ambient air 90 enter. The hot air strips the sorbent $NO_x$ from the surface sorbent. The hot gas stream containing $NO_x$ exits heater 82 via line 92 and is directed to a cyclone 94. Air 92 from cyclone 94 is used in the combustion facility (not shown). The $NO_x$ free sorbent stream 98 from fluid bed heater 82 is transported via a pneumatic lift 100 by air supplied by line 102 to cyclone 104 via line 106 according to the present invention.

Figure 5:
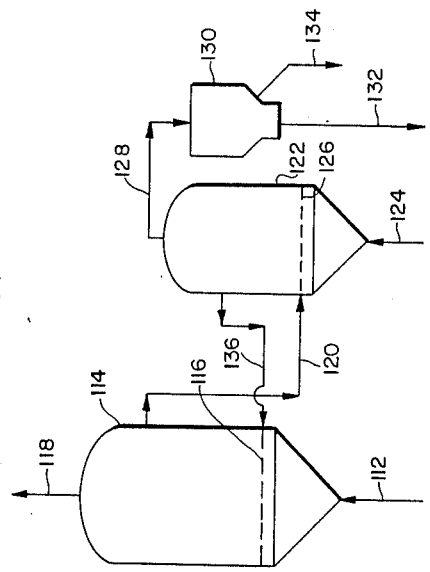
FIG. 5 is a flow diagram depicting a process according to the present invention for the removal of hydrogen sulfide from a $H_2S$ laden gas stream.

In FIG. 5, a gas stream 112 containing hydrogen sulfide as a contaminant, as from, for example, a oil shale retort or a coal gasification unit is passed through a fluidized bed sorber 114 containing sorbent according to the present invention. The sorbent rests on grid 116 in sorber 114. Hydrogen sulfide is removed from the gas stream by sorption on the surface of the sorbent. The cleaned gas stream leaving the sorber 114 via line 118 is used for its intended purpose. A hydrogen sulfide saturated sorbent stream 120 from sorber 114 is transported into a fluidized bed regenerator 122 where it is contacted with steam stream 124. The steam strips the hydrogen sulfide from the sorbent suface. In regenerator 122, the sorbent rests on grid 126. A steam and hydrogen sulfide stream 128 from regenerator 122 is then transported into a water condenser 130, where the excess steam is removed producing a high concentration hydrogen sulfide gas stream 132 and a water stream 134. The stripped sorbent from regenerator 122 is returned to sorber 114 via line 136 for reuse.

Figure 6:
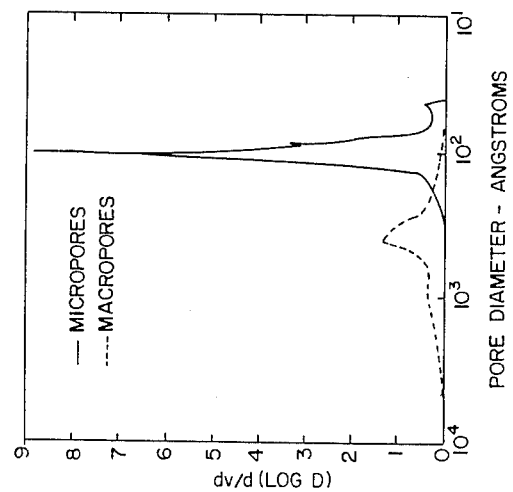
FIG. 6 shows the results of a mercury porosity test to determine the pore volume distribution in gamma alumina substrate.

FIG. 6 shows the results of a mercury porosity test to determine the pore volume distribution in the gamma-alumina substrate of the sorbent of the present invention. "D" in FIG. 6 refers to diameter. The distribution is bimodal and may be separated into a group of micropores having a probable pore radius ranging from 10 to 100 Angstroms, and a group of macropores with radii at least one and possibly two orders of magnitude larger than the micropore radii.

Figure 7:
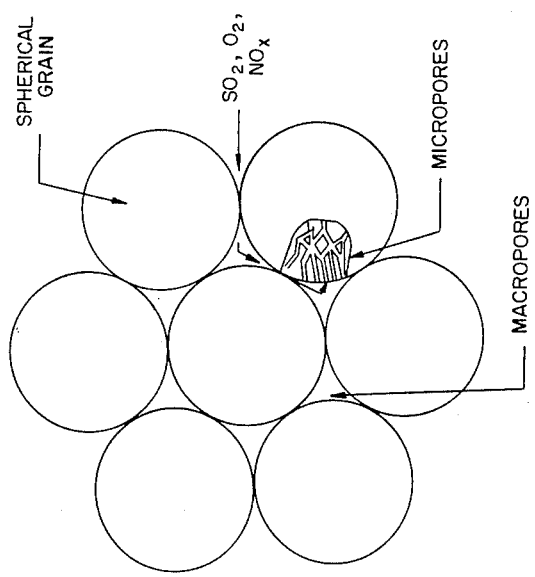
FIG. 7 is a schematic diagram showing macro and micro pores of a sorbent according to the present invention.

FIG. 7 is a schematic diagram showing macro and micro pores in the substrate of the sorbent of the present invention. The solid circles consist of tightly packed uniform spherical grains. The macropores correspond to the space in the interstices between grains, while the micropores correspond to the pores within each grain. A greater portion of the sorbent's surface area resides in the micropores, but a greater portion of pore volume is in the macropores. It is believed that the micropores, with high surface area, are where most of the chemical reaction takes place. The size of the micropores, 10 to 100 Angstroms, is similar to the size of the molecules produced on adsorption of $SO_2$. As $SO_2$ is adsorbed, the products expand into the void space available in the pore. A mechanical stress may be placed on the solid structure under conditions of high $SO_2$ loading and/or low micropore volume. The stress results in an unacceptably high rate of sorbent attrition.

The invention will now be described with reference to the following non-limiting examples:

EXAMPLE 1

Gamma-alumina prepared by the Davison Division of W. R. Grace & Co. according to U.S. Pat. Nos. 4,154,812 and 4,279,779 was treated with a surface coating of $Na_2CO_3$ equivalent to 8 weight percent $Na_2CO_3$. To accomplish this, the required amount of $Na_2CO_3$ was dissolved in a solution which was applied to the surface via an incipient wetness technique. The solid was then heated to drive off moisture, leaving a layer of $Na_2CO_3$ on the surface. The physical properties of the resulting sorbent were as follows:

weight percent sodium: 3.5
$N_2$ surface area, $m^2/g$: 222
Pore volume by $H_2O$, cc/g: 0.78
Compacted bulk density, g/cc: 0.68

EXAMPLE 2

A 100 g sample of sorbent prepared according to Example 1 (only gamma-alumina) was placed in a 2 foot by 2 inch diameter fixed bed reactor heated by a temperature-controlled tube furnace. The sorbent was contacted at 120° C. with actual flue gas from a coal-fired boiler having the following approximate volume composition: 74% $N_2$, 12% $CO_2$, 9% $H_2O$, 4% $O_2$, 0.23% $SO_2$, 0.05% NO, and 0.0025% $NO_2$. The flue gas flowrate was 10 liters per minute, measured at 25° C. and 1 atmosphere pressure.

Samples of the reactor effluent were analyzed for nitrogen oxides (NO+$NO_2$, expressed as $NO_x$) and for sulfur dioxide with the following results:

| Time On Stream (minutes) | % $NO_x$ Removal* |
|---|---|
| 15 | 100 |
| 30 | 98 |
| 45 | 95 |
| 60 | 90 |
| 75 | 80 |
| 90 | 58 |
| 6 | 100 |
| 12 | 100 |
| 18 | 100 |
| 24 | 95 |

| Time On Stream (minutes) | % NO$_x$ Removal* |
|---|---|
| 30 | 82 |
| 45 | 40 |

*Percent NO$_x$ removal = $100\left[1 - \frac{(NO_x \text{ outlet concentration})}{(NO_x \text{ inlet concentration})}\right]$ %;

similarly for percent SO$_2$ removal.

EXAMPLE 3

A 100 g sample of sorbent prepared according to Example 1 (containing weight 8% Na$_2$CO$_3$) was contacted with actual flue gas, using the same operating conditions and feed stream composition as in Example 2. The results were as follows:

| Time On Stream (minutes) | |
|---|---|
| | % NO$_x$ Removal* |
| 15 | 100 |
| 30 | 97 |
| 45 | 94 |
| 60 | 94 |
| 75 | 93 |
| 90 | 88 |
| 105 | 65 |
| | % SO$_2$ Removal* |
| 30 | 100 |
| 60 | 94 |
| 90 | 83 |
| 120 | 57 |
| 150 | 42 |

By comparing the results of Example 2 (only gamma-alumina) with the results of Example 3 (gamma-alumina plus 8% Na$_2$CO$_3$), it is clearly seen that with increasing time on stream, the sorbent of Example 3 resulted in better removal of NO$_x$ and SO$_x$.

EXAMPLE 4

A 100 g sample of sorbent prepared according to Example 1 (containing weight 8% Na$_2$CO$_3$) was heated to 570° C. and contacted with a gas containing 30% H$_2$S and 70% N$_2$ by volume. The gas flow rate was 60 liters per hour, measured at 25° C. and 1 atmosphere pressure. Samples of the reactor effluent were continuously analyzed for H$_2$S with the following results:

| Time On Stream (minutes) | % H$_2$S Removal* |
|---|---|
| 2.5 | 100 |
| 5 | 100 |
| 7.5 | 100 |
| 10 | 90 |
| 12.5 | 60 |
| 15 | 40 |

*Percent H$_2$S removal = $100\left[1 - \frac{(H_2S \text{ outlet concentration})}{(H_2S \text{ inlet concentration})}\right]$ %;

EXAMPLE 5

The spent sorbent of Example 3 was regenerated by heating to 550° C. in N$_2$ gas, and then introducing a gas stream containing 30% H$_2$S in N$_2$ for 50 minutes at 60 liters per hour. The sorbent was then contacted with steam and cooled to 120° C. After a second sorption cycle similar to Example 3, the results were as follows:

| Time On Stream (minutes) | |
|---|---|
| | % NO$_x$ Removal |
| 15 | 100 |
| 30 | 98 |
| 45 | 96 |
| 60 | 95 |
| 75 | 94 |
| 90 | 88 |
| 105 | 63 |
| | % SO$_x$ Removal |
| 0 | 100 |
| 60 | 96 |
| 90 | 70 |
| 120 | 35 |

Similar results were obtained after this sample had been adsorbed/regenerated a total of 15 times.

EXAMPLE 6

Two samples of sorbent were subjected to five cycles of adsorption/regeneration and then tested in an Air Jet Attribution Apparatus (AJAA) to determine if there was any change in attrition properties with chemical cycling. The physical properties of the two sorbents, prior to chemical cycling, were as follows:

| SORBENT | Sorbent A | Sorbent B |
|---|---|---|
| Sodium content, wt. % | 4.4 | 3.5 |
| N$_2$ surface area, m$^2$/g | 225 | 222 |
| Pore volume by H$_2$O, cc/g | 0.22 | 0.78 |
| Compacted bulk density, g/cc | 0.8 | 0.68 |

The sorbents used in Example 6 were made from different substrates, but the method of depositing the Na$_2$CO$_3$ on the surface of the substrate was the same in each case. Electron micrographs showed the surface of the Sorbent B using a gamma-alumina substrate supplied by the Davison Division of W. R. Grace & Co. to consist of similarly shaped, platelike structures with large areas of common bonding. Examination of the surface of the Sorbent A using a substrate of Reynold's gamma-alumina was depicted by electron micrograph to consist of tiny irregularly shaped particles with small areas of common bonding.

Sorbents A and B were placed in 2 foot by 2 inch diameter fixed bed reactor heated by a temperature-controlled tube furnace. Sorbents A and B were contacted at a temperature of 177° C. with actual flue gas from a coal-fired boiler containing, on average, 74% N$_2$, 12% CO$_2$, 9% H$_2$O, 4% O$_2$, 0.21% SO$_2$, 0.05% NO, and 0.0025% NO$_2$. The flue gas flowrate in each case was 10.0 liters per minute, measured at 25° C. and 1 atmosphere pressure. Sorbents A and B were then regenerated by heating the fixed bed reactor to 550° C. in N$_2$, and then introducing a stream containing 30% H$_2$S and 70% N$_2$ at 60 liters per hour, measured at 25° C. and 1 atmosphere pressure. After regeneration, Sorbents A and B were contacted with steam, cooled to 120° C., and then reused in the adsorption process.

After five cycles of adsorption, a 50 g sample of Sorbent A and Sorbent B were extracted and tested for attrition strength in an Air Jet Attrition Apparatus (AJAA). The results of this test were as follows:

| Sorbent | No. Of Cycles | Adsorption Temperature (°C.) | Length of Test (minutes) | AJAA Weight Loss (%) |
|---|---|---|---|---|
| Sorbent A | Fresh | NA | 30 | 24.3 |
| | 5 Cycles | 177 | 10 | 41.5 |
| Sorbent B | Fresh | NA | 30 | 4.3 |
| | 5 Cycles | 177 | 30 | 3.0 |

Attrition losses measured in this test for fresh (unreacted) Sorbent A were over five times greater than fresh Sorbent B. In addition, the performance of Sorbent A deteriorated substantially with chemical cycling, while that of Sorbent B did not. Sorbent loading was similar for Sorbents A and B, corresponding to 5 grams $SO_2$ adsorbed per 100 grams sorbent. The relatively poor performance of Sorbent A vis-a-vis Sorbent B is believed to be attributed to differences in the surface structure of the two substrates.

EXAMPLE 7

Sorbent B used in Example 6 was tested to determine if the attrition rate would be affected by increases in the temperature of adsorption or number of cycles of adsorption and regeneration. The methods of adsorption and regeneration were the same as that described in Examples 3 and 5. The average sorbent load varied with adsorption temperature, ranging from 5 to 2.5 grams $SO_2$ adsorbed per 100 grams sorbent, at 88° C. and 300° C., respectively. The sorbent load in a series of 5, 10 and 15 cycle tests at 120° C. was constant at 5 grams $SO_2$ adsorbed per 100 grams sorbent. The results were as follows:

| No. Of Cycles | Adsorption Temperature (°C.) | Length of Test (minutes) | AJAA Weight Loss (%) |
|---|---|---|---|
| Fresh | NA | 30 | 4.3 |
| 5 Cycles | 105 | 30 | 3.9 |
| 5 Cycles | 120 | 30 | 3.2 |
| 5 Cycles | 177 | 30 | 3.0 |
| 5 Cycles | 285 | 30 | 1.7 |
| 10 Cycles | 120 | 30 | 3.8 |
| 15 Cycles | 120 | 30 | 5.2 |

The above results show that the attrition rate of Sorbent B is unaffected by increased temperature of adsorption or increased number of chemical cycles.

EXAMPLE 8

The AJAA test is commonly used in industry to assess the relative attrition strengths of different solid catalysts. To predict attrition losses in large scale processing, however, the test data must be correlated with actual measured attrition losses in pilot or commercial scale systems. Samples of fresh (unreacted) Sorbent B were submitted to the United States Department of Energy ("DOE") for testing on their AJAA apparatus. The results were as follows:

| Time of Test (minutes) | Cumulative % Weight Loss (AJAA as used In Example 6) | Cumulative % Weight Loss (DOE AJAA) |
|---|---|---|
| 10 | 2.6 | 0.12 |
| 20 | 3.8 | 0.27 |
| 30 | 4.2 | 0.49 |

Obviously, the AJAA according to Example 6 subjects the sample to a more severe test of attrition strength. Such differences are not uncommon in AJAA testing where the results are very sensitive to the design of the test apparatus, i.e., the air nozzle design (small differences in the air nozzle design can cause differences in the test results). Nevertheless, all results reported in Examples 6, 7, and 9 (below) were generated through identical procedures using the same test apparatus. The data may therefore be compared to assess the relative attrition characteristics of the samples tested.

The Department of Energy reports AJAA test losses similar to those cited above for fresh Sorbent B have been obtained on samples from batches that exhibited a steady-state attrition rate of 0.02 to 0.03% of the circulating solids inventory measured in pilot-scale tests on a fluidized bed adsorber.

EXAMPLE 9

A sample of Sorbent B was coated with $Na_2CO_3$ equivalent to 21 weight %. The physical properties of this sorbent, designated Sorbent C, are as given hereinbelow. The physical properties of the substrate and Sorbent B are shown for comparison. Note that Sorbent C has considerably less surface area and pore volume than either the substrate or Sorbent B.

| | Substrate (gamma-alumina) | Sorbent B | Sorbent C |
|---|---|---|---|
| % sodium | 0 | 3.5 | 9.1 |
| $N_2$ surface area, m²/g | 216 | 222 | 122 |
| Pore volume by $H_2O$, cc/g | 0.78 | 0.78 | 0.48 |
| Compacted bulk density, g/cc | 0.62 | 0.68 | 0.86 |

Sorbent C was subjected to five cycles of adsorption in flue gas at 260° C. in a procedure identical to that of Example 3. Sorbent C was regenerated by heating the reactor to 650° C. in $N_2$, then introducing a stream containing 30% $H_2$ and 70% $N_2$ at about 1 liter per minute for 40 minutes. The results of this test are given hereinbelow. An identical series of tests using $H_2S$ as the reducing gas is shown for comparison. It should be noted that treatment with $H_2S$ does not fully regenerate the sorbent. Furthermore, as $SO_2$ loading increases on regeneration with $H_2$, loss on attrition increases substantially.

| Regenerant | $H_2$ | $H_2S$ |
|---|---|---|
| Number of cycles | 5 | 5 |
| Average $SO_2$ loading* | 13 | 6 |
| Time of test (minutes) | 20 | 30 |
| AJAA weight loss (%) | 19.4 | 5.0 |

*Average $SO_2$ Loading = $\dfrac{\text{grams } SO_2 \text{ adsorbed}}{100 \text{ grams sorbent}}$ The unacceptably high rate of sorbent attrition exhibited by Sorbent C is believed to be caused by a combination of low surface area and high $SO_2$ loading. When Sorbent B with twice the surface area and 40% of the SO₂ loading shown above was subjected to a similar test (see Example 8), measured attrition loss was 2 to 5 weight percent in a 30 minute test. Sorbent surface area, pore volume, and SO₂ loading are critical factors in obtaining economically acceptable rates of sorbent attrition.

The present invention may be embodied in other specific forms without departing from the spirit or essential attributes thereof and, accordingly, reference should be made to the appended claims, rather than to the foregoing specification, as indicating the scope of the invention.

What is claimed is:

1. A regenerable attrition resistant sorbent useful in a fluidized bed for the removal of gaseous nitrogen oxides, sulfur oxides and hydrogen sulfide from waste gas streams, which sorbent comprises
   (a) a gamma alumina substrate having a surface area between 100 m²/g and 500 m²/g and a pore volume between 0.4 and 0.8 cc/g, said gamma alumina substrate having a bimodal pore size distribution comprising micropores and macropores, said micropores having an average pore diameter $d_1$ in the range of between 30 and 400 Angstroms and said macropores having an average pore diameter $d_2$ in the range of between 80 and 3000 Angstroms, and
   (b) an alkali metal component, said substrate impregnated with said alkali metal component and the amount of said alkali metal component being between 50 and 400 μg per m² of said substrate.

2. The sorbent of claim 1, wherein said amount of said alkali metal component is between 100 and 350 μg per m² of said substrate.

3. The sorbent of claim 1, wherein said amount of said alkali metal component is between 150 and 250 μg per m² of said substrate.

4. The sorbent of claim 1, wherein said macropores of said substrate have an average pore diameter $d_2$ of 100 and 1000 Angstroms.

5. The sorbent of claim 1, wherein said macropores of said substrate have an average pore diameter $d_2$ of 200 and 500 Angstroms.

6. The sorbent of claim 1 wherein said micropores have an average pore diameter $d_1$ of between 60 and 200 Angstroms.

7. The sorbent of claim 1 wherein said micropores have an averge pore diameter $d_1$ of between 80 and 100 Angstroms.

8. The sorbent of claims 1 wherein said pore volume is between 0.6 and 0.8 cc/g.

9. The sorbent of claim 1, wherein said alkali metal component is selected from the group consisting of sodium, lithium, potassium, rubidium, cesium and francium.

10. The sorbent of claim 9, wherein said alkali metal component is sodium.

11. The sorbent of claim 9 wherein said alkali metal component is potassium.

12. A regenerable attrition resistant sorbent useful in a fluidized bed for the removal of gaseous nitrogen oxides, sulfur oxides and hydrogen sulfide from waste gas streams, which sorbent comprises:
   (a) a gamma alumina substrate having a surface area between 100 m²/g and 500 m²/g and a pore volume between 0.6 and 0.8 cc/g, and
   (b) an alkali metal component, said substrate impregnated with said alkali metal component and the amount of said alkali metal component being between 150 and 250 μg per m² of said substrate.

13. The sorbent of claim 12, wherein said alkali metal component is selected from the group consisting of sodium, lithium, potassium, rubidium, cesium and francium.

* * * * *